US010650595B2

(12) United States Patent
Leppänen et al.

(10) Patent No.: US 10,650,595 B2
(45) Date of Patent: May 12, 2020

(54) MEDIATED REALITY

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 23 days.

(21) Appl. No.: 15/741,866

(22) PCT Filed: Jul. 4, 2016

(86) PCT No.: PCT/FI2016/050489
§ 371 (c)(1),
(2) Date: Jan. 4, 2018

(87) PCT Pub. No.: WO2017/005973
PCT Pub. Date: Jan. 12, 2017

(65) Prior Publication Data
US 2018/0204384 A1 Jul. 19, 2018

(30) Foreign Application Priority Data

Jul. 9, 2015 (EP) ..................................... 15175990

(51) Int. Cl.
G06T 19/00 (2011.01)
G06F 3/00 (2006.01)
G06F 3/01 (2006.01)

(52) U.S. Cl.
CPC ............ *G06T 19/006* (2013.01); *G06F 3/012* (2013.01); *G06T 19/00* (2013.01); *G06T 19/003* (2013.01)

(58) Field of Classification Search
CPC ..... G06T 19/006; G06T 19/003; G06T 19/00; G06F 3/012
See application file for complete search history.

(56) References Cited

U.S. PATENT DOCUMENTS

| 2003/0054882 | A1* | 3/2003 | Suzuki | G06K 9/46 463/30 |
| 2004/0113885 | A1* | 6/2004 | Genc | G06F 3/011 345/156 |
| 2012/0105473 | A1 | 5/2012 | Bar-Zeev et al. | |

(Continued)

FOREIGN PATENT DOCUMENTS

| EP | 3040835 A1 | 7/2016 |
| WO | 2015/093129 A1 | 6/2015 |

OTHER PUBLICATIONS

"How to Remove Anything from a Photo in Photoshop", Youtube, Retrieved on Jan. 2, 2018, Webpage available at : https://www.youtube.com/watch?v=ifhEx4adAa8.

(Continued)

*Primary Examiner* — Tapas Mazumder
(74) *Attorney, Agent, or Firm* — Harrington & Smith

(57) ABSTRACT

A method comprising: displaying a background of a scene from a first point of view and a foreground of the scene from the first point of view; displaying a background of the scene from the first point of view and a modified foreground of the scene from the first point of view; displaying a background of a scene from a second point of view and a modified foreground; and displaying a background of a scene from the second point of view and a foreground of the scene from the second point of view.

20 Claims, 7 Drawing Sheets

(56) References Cited

U.S. PATENT DOCUMENTS

2013/0135295 A1    5/2013  Li et al.
2014/0321702 A1   10/2014  Schmalstieg
2015/0325026 A1* 11/2015  Haase .................... G06T 13/00
                                                             345/473

OTHER PUBLICATIONS

"Famous Faces Morphing", Youtube, Retrieved on Jan. 2, 2018, Webpage available at : https://www.youtube.com/watch?v=wZurRt0Tidl.
"Video Tracking", Wikipedia, Retrieved on Jan. 2, 2018, Webpage available at : https://en.wikipedia.org/wiki/Video_tracking.
Extended European Search Report received for corresponding European Patent Application No. 15175990.9, dated Jan. 20, 2016, 5 pages.
International Search Report and Written Opinion received for corresponding Patent Cooperation Treaty Application No. PCT/FI2016/050489, dated Sep. 28, 2016, 10 pages.
Search Report received for corresponding United Kingdom Patent Application No. 1611586.7, dated Dec. 21, 2016, 3 pages.
Fischer, Jan, et al., "Enhanced Visual Realism by Incorporating Camera Image Effects", IEEE/ACM International Symposium on Mixed and Augmented Reality, Oct. 2006, pp. 205-208.

* cited by examiner

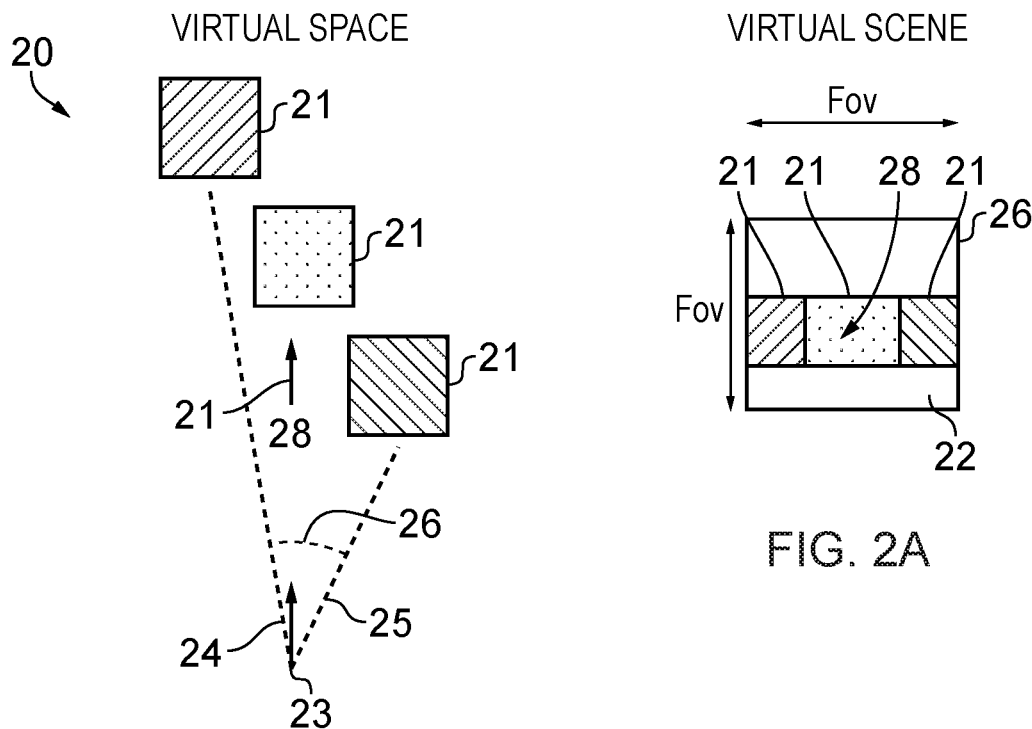
FIG. 1A
FIG. 2A
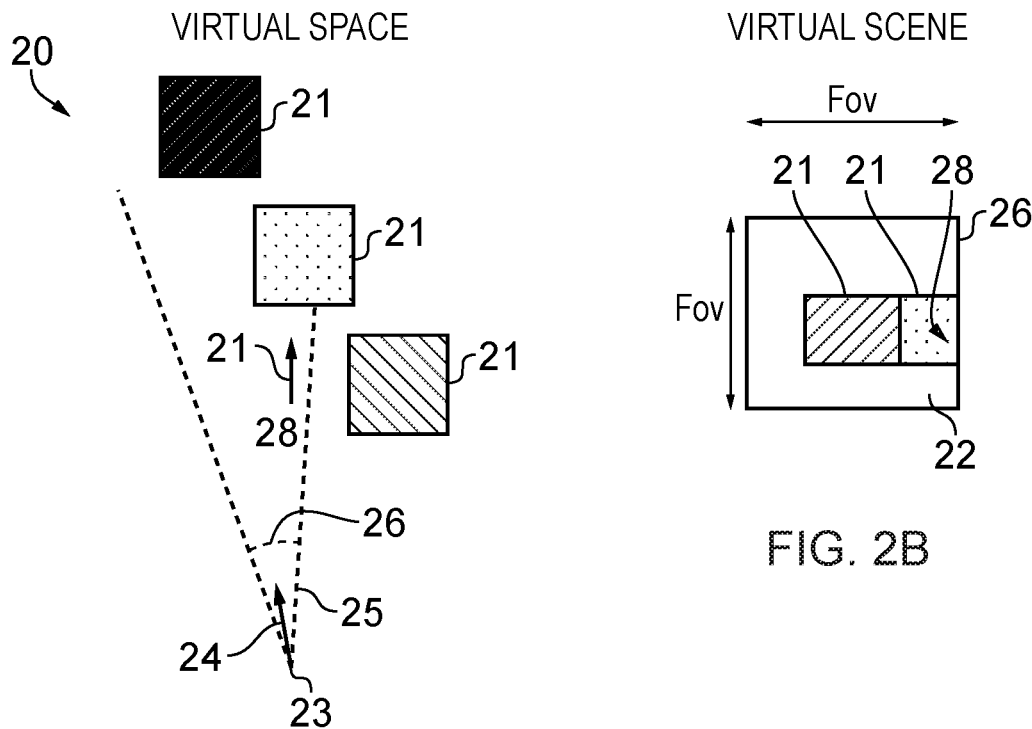
FIG. 1B
FIG. 2B

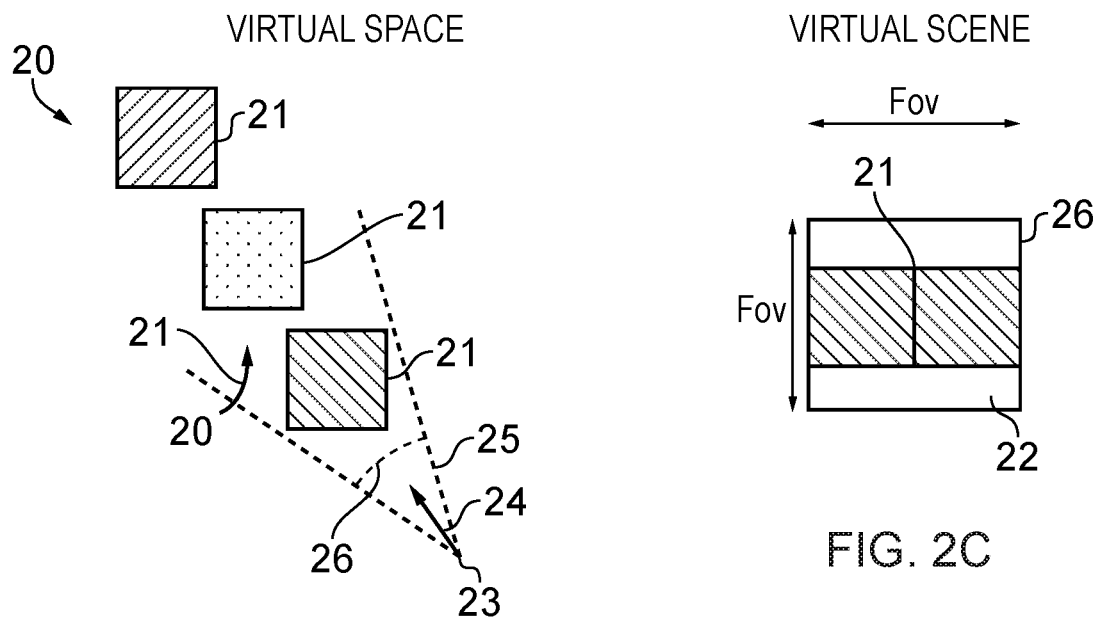
FIG. 1C
FIG. 2C
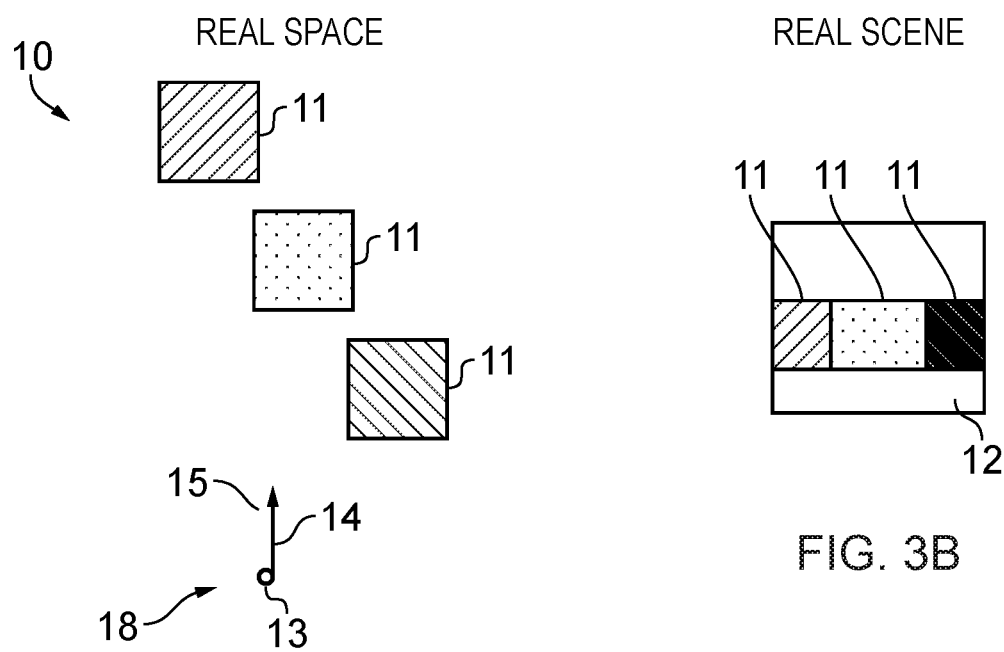
FIG. 3A
FIG. 3B $t_1$ $t_1 + \Delta$ $t_2 - \Delta$ $t_2$

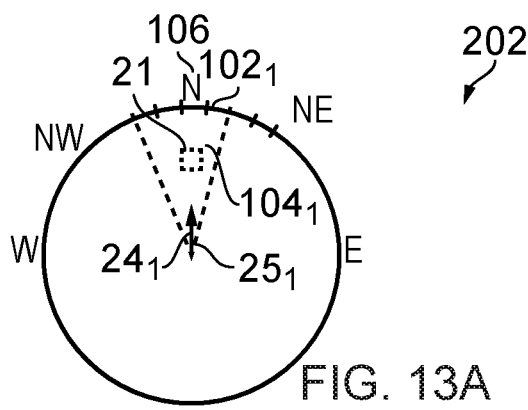 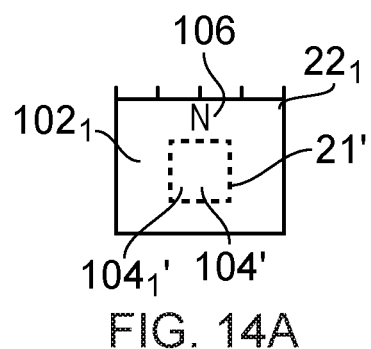
FIG. 13A    FIG. 14A
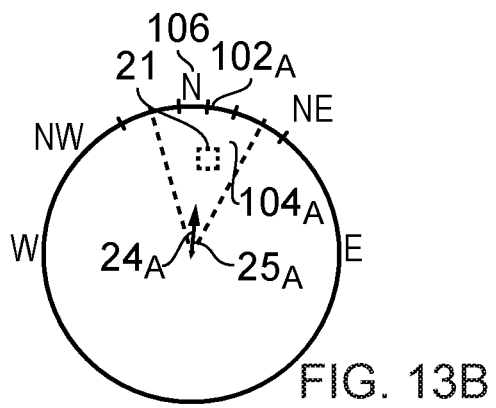 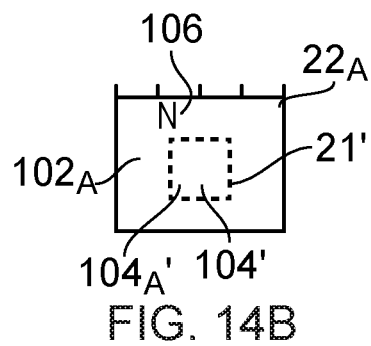
FIG. 13B    FIG. 14B
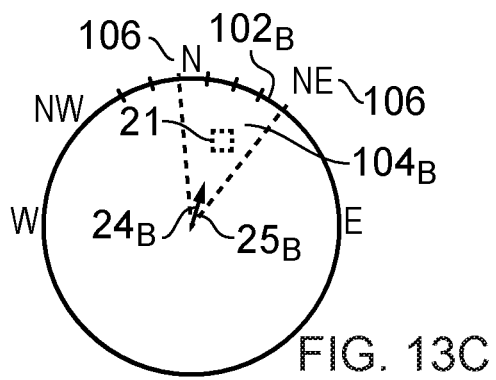 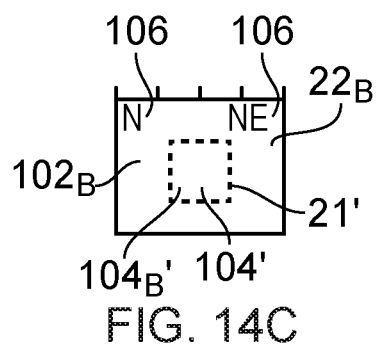
FIG. 13C    FIG. 14C
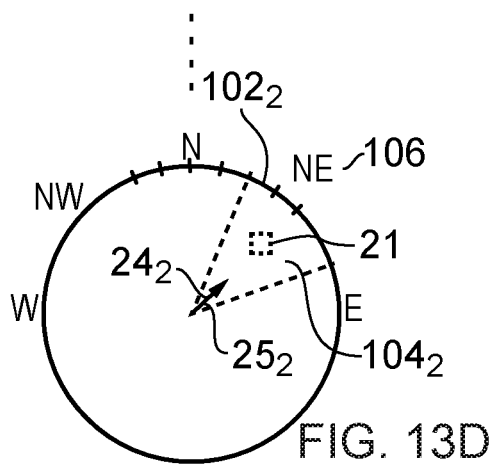 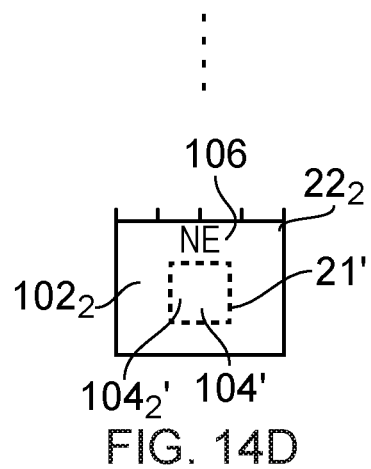
FIG. 13D    FIG. 14D

MEDIATED REALITY

RELATED APPLICATION

This application was originally filed as Patent Cooperation Treaty Application No. PCT/FI2016/050489 filed Jul. 4, 2016 which claims priority benefit to European Patent Application No. 15175990.9, filed Jul. 9, 2015.

TECHNOLOGICAL FIELD

Embodiments of the present invention relate to mediated reality for example augmented reality or virtual reality.

BACKGROUND

Mediated reality in this document refers to a user experiencing a fully or partially artificial environment.

Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising: displaying a background of a scene from a first point of view and a foreground of the scene from the first point of view; displaying a background of the scene from the first point of view and a modified foreground; displaying a background of a scene from a second point of view and a modified foreground; and displaying a background of a scene from the second point of view and a foreground of the scene from the second point of view.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual space and different points of view and FIGS. 2A, 2B, 2C illustrate a virtual scene from the perspective of the respective points of view;

FIG. 3A illustrates an example of a real space and FIG. 3B illustrates an example of a real scene that partially corresponds with the virtual scene of FIG. 2A;

FIGS. 13A, 13B, 13C, 13D illustrate the simplified example of the virtual space at points in time between times t1 and t2, with a variable point of view and modification of foreground;

FIGS. 14A, 14B, 14C, 14D illustrate virtual scenes corresponding to the points of view and scene content of FIGS. 13A, 13B, 13C, 13D.

DEFINITIONS

Figure 4:
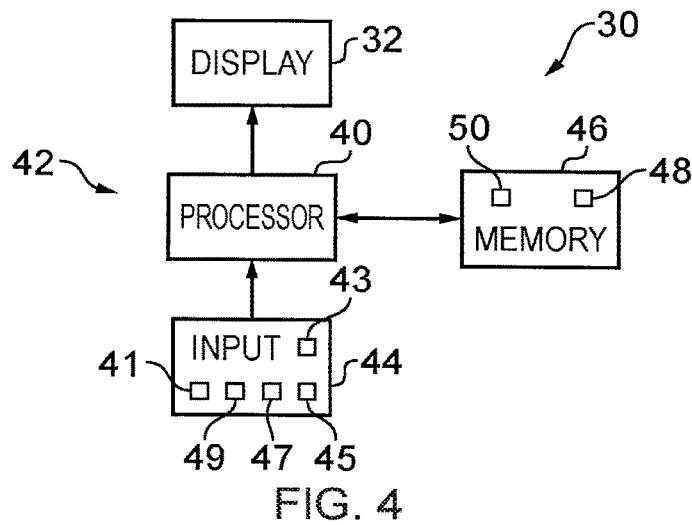
FIG. 4 illustrates an example of an apparatus that is operable to enable mediated reality and/or augmented reality and/or virtual reality.

"virtual space" refers to fully or partially artificial environment, which may be three dimensional.

"virtual scene" refers to a representation of the virtual space viewed from a particular point of view within the virtual space.

"real space" refers to a real environment, which may be three dimensional.

"real scene" refers to a representation of the real space viewed from a particular point of view within the real space.

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user.

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"virtual reality" in this document refers to a form of mediated reality in which a user visually experiences a fully artificial environment (a virtual space) as a virtual scene displayed by an apparatus to a user;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"user interactive-mediated" as applied to mediated reality, augmented reality or virtual reality means that user actions at least partially determine what happens within the virtual space;

"displaying" means providing in a form that is perceived visually by the user.

DESCRIPTION

FIGS. 1A-1C and 2A-2C illustrate examples of mediated reality. The mediated reality may be augmented reality or virtual reality.

FIGS. 1A, 1B, 1C illustrate the same virtual space 20 comprising the same virtual objects 21, however, each Fig illustrates a different point of view 24. The position and direction of a point of view 24 can change independently. The direction but not the position of the point of view changes from FIG. 1A to FIG. 1B. The direction and the position of the point of view 24 changes from FIG. 1B to FIG. 1C.

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position 23 and/or direction 25 of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual space 20.

FIG. 3B illustrates a real scene 12 that partially corresponds with the virtual scene 22 of FIG. 2A, it includes real objects 11 but not artificial virtual objects. The real scene 12 is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 10 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view or on multiple images from different points of view at the same time, processed to generate an image from a single point of view.

FIG. 4 illustrates an example of an apparatus 30 that is operable to enable mediated reality and/or augmented reality and/or virtual reality.

The apparatus 30 comprises a display 32 for providing at least parts of the virtual scene 22 to a user in a form that is perceived visually by the user. The display 32 may be a visual display that provides light that displays at least parts of the virtual scene 22 to a user. Examples of visual displays include liquid crystal displays, organic light emitting displays, emissive, reflective and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B. The processor 40 by reading the memory 46 is able to load and execute the computer program 48.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal, such as a modulated electromagnetic wave or digitally encoded electrical signal, configured to reliably transfer the computer program 48. The apparatus 30 may propagate or transmit the computer program 48 as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 5A:
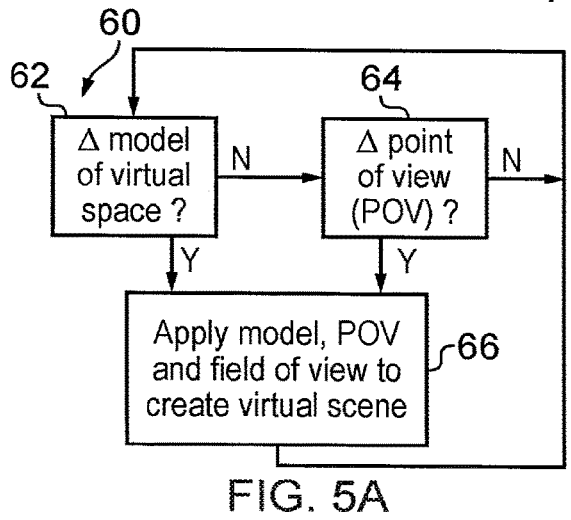
FIG. 5A illustrates an example of a method for enabling mediated reality and/or augmented reality and/or virtual reality.
Figure 5B:
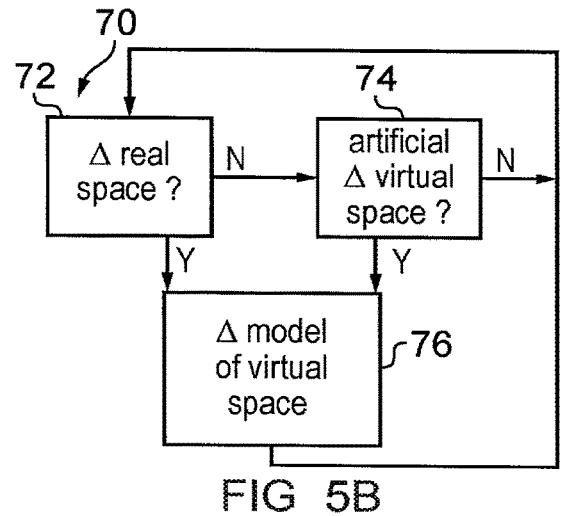
FIG. 5B illustrates an example of a method for updating a model of the virtual space for augmented reality.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the process illustrated in FIG. 5A or a similar process. The controller 42 stores and maintains a model 50 of the virtual space 20. The model may be provided to the controller 42 or determined by the controller 42. For example, sensors in input circuitry 44 may be used to create overlapping depth maps of the virtual space 20 from different points of view and a three dimensional model may then be produced.

At block 62 it is determined whether or not the model of the virtual space 20 has changed. If the model of the virtual space 20 has changed the method moves to block 66. If the model of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 5B illustrates a method 70 for updating a model of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual space 20, changing the virtual scene 22. The point of view 24 may be continuously variable in position 23 and/or direction 25 and user action changes the position 23 and/or direction 25 of the point of view 24. Alternatively, the point of view 24 may have discrete quantised positions 23 and/or discrete quantised directions 25 and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view 14 is used by the controller 42 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation.

The apparatus 30 may comprise as part of the input circuitry 44 point of view sensors 45 for determining changes in the real point of view 14.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
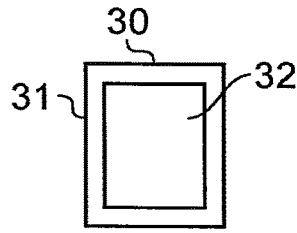
FIGS. 6A and 6B illustrate examples of apparatus that enable display of at least parts of the virtual scene to a user.
Figure 6B:
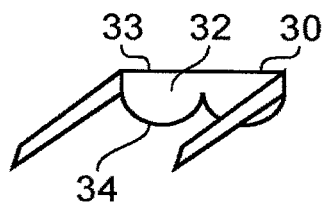

FIGS. 6A and 6B illustrate examples of apparatus 30 that enable display of at least parts of the virtual scene 22 to a user. Other examples of apparatus 30 that enable display of at least parts of the virtual scene 22 to a user may be used.

FIG. 6A illustrates a handheld apparatus 31 comprising a display screen as display 32 that displays images to a user and is used for displaying the virtual scene 22 to the user. The apparatus 30 may be moved deliberately in the hands of a user in one or more of the previously mentioned six degrees of freedom.

The handheld apparatus 31 may be or may be operated as a see-video arrangement for augmented reality that enables a live or recorded video of a real scene 12 to be displayed on the display 32 for viewing by the user while one or more visual elements 28 are simultaneously displayed on the display 32 for viewing by the user. The combination of the displayed real scene 12 and displayed one or more visual elements 28 provides the virtual scene 22 to the user.

If the handheld apparatus 30 has a camera mounted on a face opposite the display 32, it may be operated as a see-video arrangement that enables a live real scene 12 to be viewed while one or more visual elements 28 are displayed to the user to provide in combination the virtual scene 22.

FIG. 6B illustrates a head-mounted apparatus 33 comprising a display 32 that displays images to a user. The apparatus 33 may be moved automatically when a head of the user moves.

The head-mounted apparatus 33 may be a see-through arrangement for augmented reality that enables a live real scene 12 to be viewed while one or more visual elements 28 are displayed by the display 32 to the user to provide in combination the virtual scene 22. In this case a visor 34, if present, is transparent or semi-transparent so that the live real scene 12 can be viewed through the visor 34.

The head-mounted apparatus 33 may be operated as a see-video arrangement for augmented reality that enables a live or recorded video of a real scene 12 to be displayed by the display 32 for viewing by the user while one or more visual elements 28 are simultaneously displayed by the display 32 for viewing by the user. The combination of the displayed real scene 12 and displayed one or more visual elements 28 provides the virtual scene 22 to the user. In this case a visor 34 is opaque and may be used as display 32.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts of a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a person's body, for example one or more joints of the person's body. In some examples, the apparatus 30 may perform full body skeletal tracking of a person's body.

The tracking of one or more objects and/or points in relation to a person's body may be used by the apparatus 30 in gesture recognition.

Figure 7:
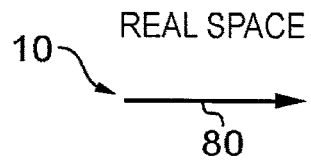
FIG. 7 illustrates an example of a gesture in a real space and FIG. 8 illustrates a corresponding representation of the gesture rendered in the virtual scene.

Referring to FIG. 7, a particular gesture 80 in the real space 10 is a gesture user input used as a 'user control' event by the controller 42 to determine what happens within the virtual space 20. A gesture user input is a gesture 80 that has meaning to the apparatus 30 as a user input.

Figure 8:
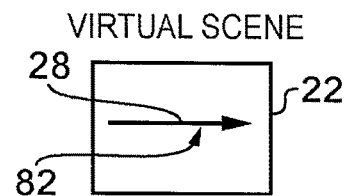

Referring to FIG. 8, in some but not necessarily all examples, a corresponding representation of the gesture 80 in real space is rendered in the virtual scene 22. The representation involves one or more visual elements 28 moving 82 to replicate or indicate the gesture 80 in the virtual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location relative in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture 80 may be performed in one spatial dimension (1D gesture), two spatial dimensions (2D gesture) or three spatial dimensions (3D gesture).

FIGS. 9A, 9B, 10A, 10B, 11A-11D, 13A-13D illustrate a simplified example of a virtual space 20, as previously described, for the purposes of illustrating how a transition between a first point of view and a second point of view can be achieved when the first and second points of view relate to different times and/or different directions. In these examples, the point of view 24 used to define a virtual scene 22 has a fixed position and the point of view 24 changes its direction in only an azimuthal direction (yaw), there is no change in pitch or roll.

The virtual space 20 is for the purposes of this illustration illustrated as a circle with the position of the point of view 24 at the center of the circle. The circumference of the circle represents a background 102 of the virtual space 20 in 360 degrees. The area between the circumference and the center represents a foreground 104 of the virtual space 20. In this examples, background 102 comprises distinctive content 106, in the form of compass bearing markings, however, this content is only for the purposes of illustration, so that relative rotation between the point of view 24 and the background 102 can be easily visualized in the virtual space 20 and the virtual scene 22. Other content is possible.

A virtual object 21, which may be a real object 11 or a visual element 28, is located at a first position within the foreground 104 at a time t1 and is located at a second, different, position within the foreground 104 at a different time t2.

Figure 9A:
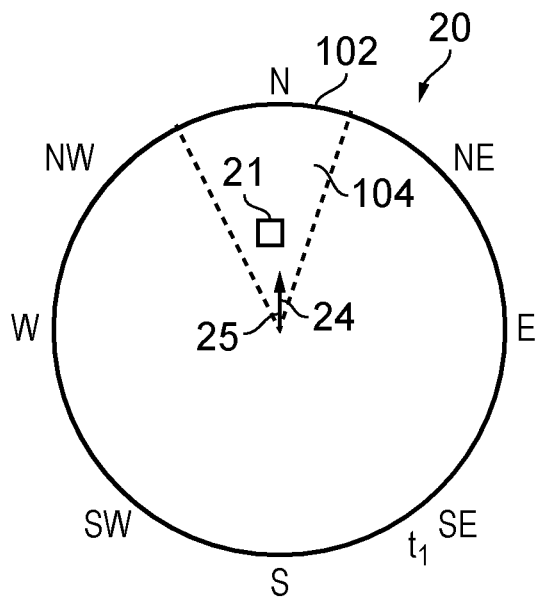
FIGS. 9A and 9B illustrate a simplified example of a virtual space at times t1 and t2, with a fixed point of view.
Figure 9B:
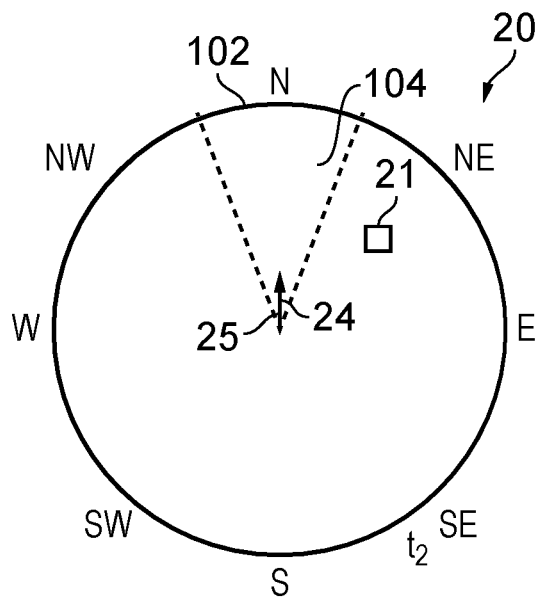

As illustrated in FIGS. 9A and 9B, if the direction 25 of the point of view 24 remains fixed between times t1 and t2, then at the time t2 the virtual scene 22 does not comprise the virtual object 21.

Figure 10A:
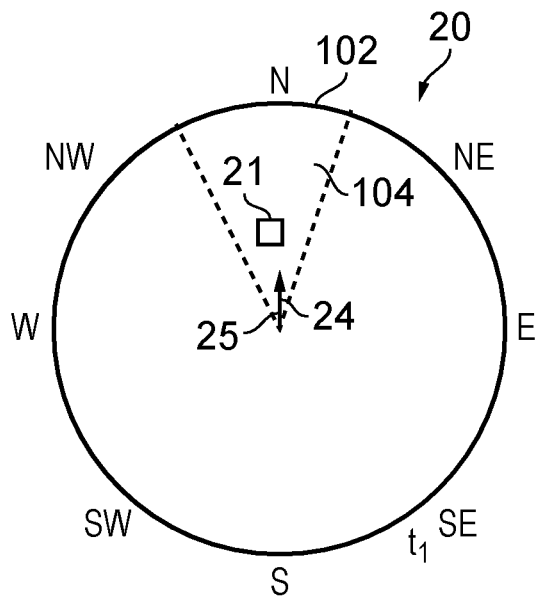
FIGS. 10A and 10B illustrate the simplified example of the virtual space at times t1 and t2, with a variable point of view.
Figure 10B:
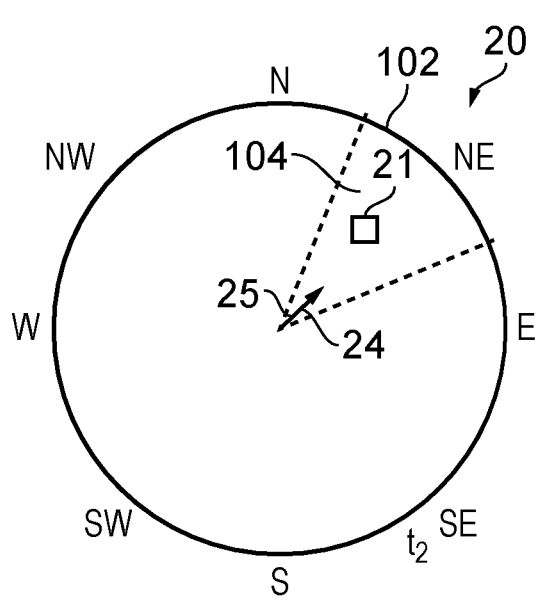

As illustrated in FIGS. 10A and 10B, if the direction 25 of the point of view 24 changes between times t1 and t2, then at the time t2 the virtual scene 22 can comprise the virtual object 21. However, this can be disorienting for a user, when skipping between time t1 to time t2, as it may appear that the foreground object 21 is stationary in front of a rapidly changing background 102.

This problem is addressed by the method 200 illustrated in FIGS. 11A-11D and 12A-12D. The FIGS. 11A to 11D progress through time between time t1 to time t2. The time determines the location of the object 21 within the virtual space 20.

Although FIGS. 11A-11D and 12A-12D will be described in the sequence A to D, that is in terms of a skip forward in time from time t1 to time t2, it should be understood that the method 200 may also occur in the opposite sense in the sequence D to A, that is in terms of a skip backward in time from time t2 to time t1.

Each of the FIGS. 11A-11D illustrates a virtual space 20 and point of view 24 and has a corresponding FIG. 12A-12D illustrating a virtual scene 22 defined by the direction 25 of the point of view 24.

Each of FIGS. 11A-11D illustrates the relative direction 25 of the point of view 24 with respect to the background 102 of the virtual space 20 and how this changes over time.

Each of FIGS. 11A-11D illustrates a display state of the virtual object 21 described previously with reference to FIGS. 9A-9B and 10A-10B. A solid outline to the virtual object 21 indicates that the virtual object 21 is displayed in the corresponding virtual scene 22 in an unmodified state and is clearly visible. A dotted outline to the virtual object 21 indicates that the virtual object 21 is displayed in the corresponding virtual scene 22 in a modified state and is not clearly visible.

In some but not necessarily all examples, only the virtual object 21 in the foreground 104 is modified when displayed. In other examples, a whole of the foreground 104 is modified when displayed. Both of these are examples of displaying a modified foreground 104.

Figure 11A:
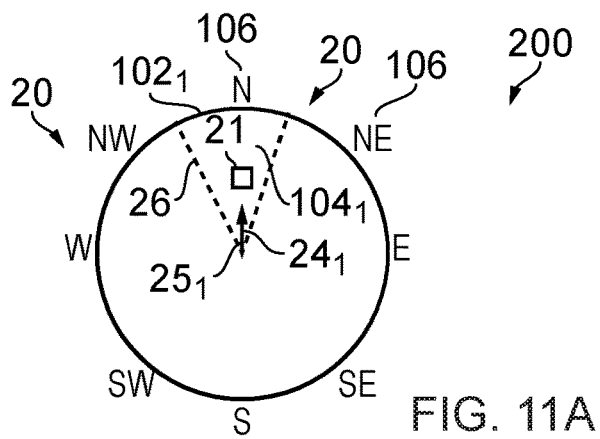
FIGS. 11A, 11B, 11O, 11D illustrate the simplified example of the virtual space between times t1 and t2, with a variable point of view and modification of foreground.
Figure 12A:
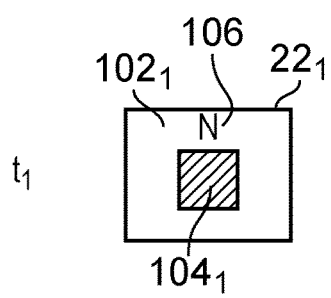
FIGS. 12A, 12B, 12C, 12D illustrate virtual scenes corresponding to the points of view and scene content of FIGS. 11A, 11B, 11O, 11D.

As illustrated in FIGS. 11A, 12A, at time t1, the method 200 causes display of a background $102_1$ of a scene $22_1$ from a first point of view $24_1$ in a first direction $25_1$ and display of a foreground $104_1$ of the scene $22_1$ from the first point of view $24_1$. The background $102_1$ and the foreground $104_1$ displayed in the scene $22_1$ are both unmodified and from the same point of view $24_1$.

Figure 11B:
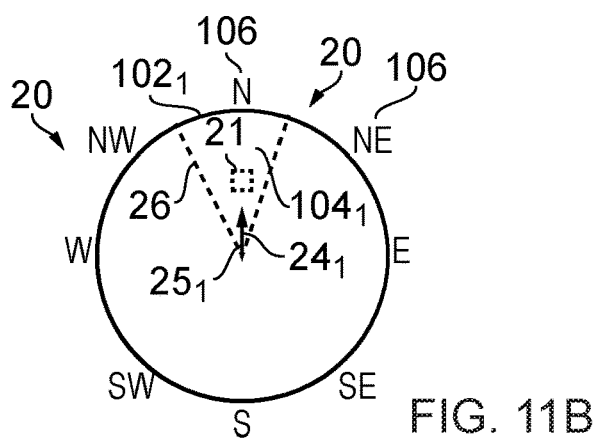
Figure 12B:
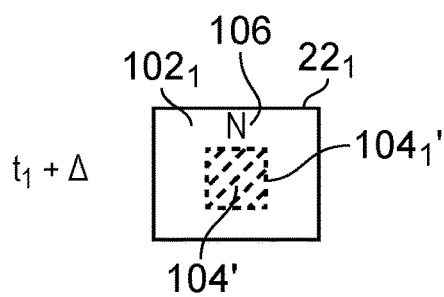

Next, as illustrated in FIGS. 11B, 12B, at or after time t1, the method 200 causes display of the background $102_1$ of the scene $22_1$ from the first point of view $24_1$ in the first direction $25_1$ and display of a modified foreground 104'. The background $102_1$ and the modified foreground 104' displayed in the scene $22_1$ may be from the same point of view $24_1$, however, the background $102_1$ is unmodified and the modified foreground 104' is modified.

In some but not necessarily all examples, the modified foreground 104', as illustrated in FIG. 12B, may be a modified version of the foreground $104_1$ determined by the first point of view $24_1$ illustrated in FIG. 11B. In these examples, the background $102_1$ and the modified foreground 104' displayed in the scene $22_1$ are from the same point of view $24_1$ and in these examples the modified foreground 104' is labeled $104_1'$.

Figure 11C:
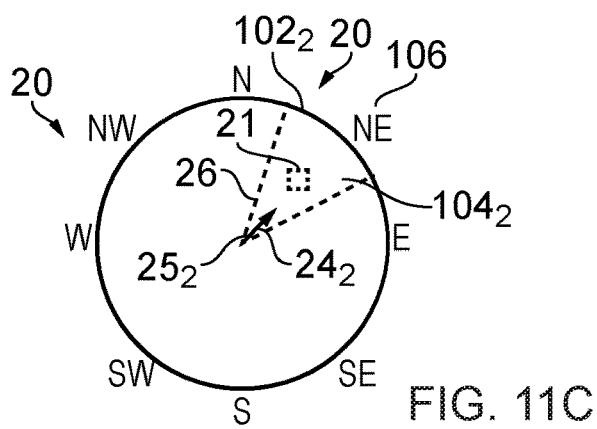
Figure 12C:
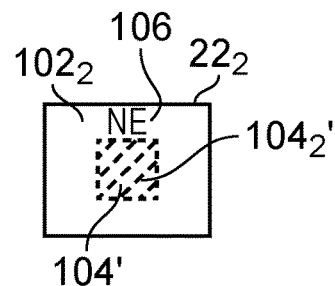

Next, as illustrated in FIGS. 11C, 12C, at or just before time t2, the method 200 causes display of a background $102_2$ of a scene $22_2$ from a second point of view $24_2$ in a second direction $25_2$ and a modified foreground 104'. The background $102_2$ and the modified foreground 104' displayed in the scene $22_2$ may be from the same point of view $24_2$, however, the background $102_2$ is unmodified and the modified foreground 104' is modified.

In some but not necessarily all examples, the modified foreground 104', as illustrated in FIG. 12C, may be a modified version of the foreground $104_2$ determined by the second point of view $24_2$ illustrated in FIG. 11C. In these examples, the background $102_2$ and the modified foreground 104' displayed in the scene $22_2$ are from the same point of view $24_2$ and in these examples the modified foreground 104' is labeled $104_2'$.

Figure 11D:
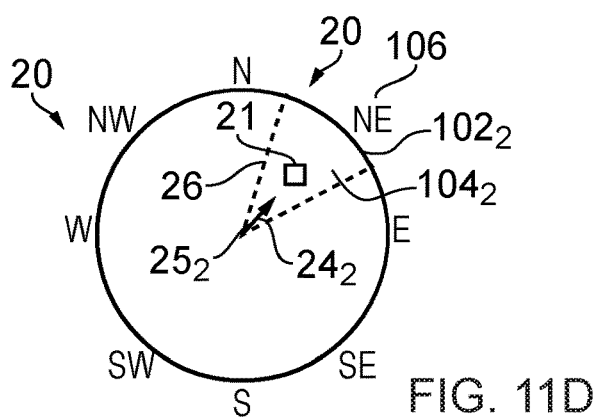
Figure 12D:
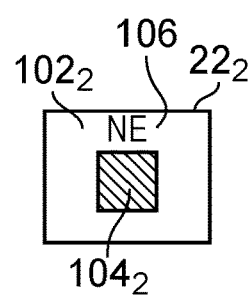

Next, as illustrated in FIGS. 11D, 12D, at time t2, the method 200 causes display of a background $102_2$ of a scene $22_2$ from the second point of view $24_2$ in the second direction $25_2$ and a foreground $104_2$ of the scene $22_2$ from the second point of view $24_2$. The background $102_2$ and the foreground $104_2$ displayed in the scene $22_2$ are both unmodified and from the same point of view $24_2$.

In some examples, the modified foreground $104_1'$ of the scene $22_1$ from the first point of view $24_1$ (FIGS. 11B, 12B) and the modified foreground $104_2'$ of the scene $22_2$ from the second point of view $24_2$ (FIGS. 11O, 12C) refers to a modification of a whole of the foreground.

In other examples, the modified foreground $104_1'$ of the scene $22_1$ from the first point of view $24_1$ (FIGS. 11B, 12B) and the modified foreground $104_2'$ of the scene $22_2$ from the second point of view $24_2$ (FIGS. 11O, 12C) refers to a modification of only one or more objects 21 in the foreground. For example, an object 21 that is common to the foreground $104_1$ of the scene $22_1$ from the first point of view $24_1$ (FIG. 11B) and to the foreground $104_2$ of the scene $22_2$ from the second point of view $24_2$ (FIG. 11C), despite having different perspective views, is a 'common object'. The term 'modified foreground' may refer to a modification of a common object or objects 21. The modified foreground $104_1'$ of the scene $22_1$ from the first point of view $24_1$ may therefore refer to modification of only common object(s) 21 that is/are in the foreground $104_1$ of the scene $22_1$ from the first point of view $24_1$ (FIGS. 11B, 12B). The modified foreground $104_2'$ of the scene $22_2$ from the second point of view $24_2$ may therefore refer to modification of only common object(s) 21 that is/are in the foreground $104_2$ of the scene $22_2$ from the second point of view $24_2$ (FIGS. 11C, 12C).

In this example, but not necessarily all examples, the scene $22_2$ from the second point of view $24_2$ (FIGS. 11O, 12C) depends upon a selected time t2 or a selected time skip t2−t1. The selection may be performed by a user. The time skip defines a difference in time (t2−t1) between the displayed scene $22_1$ from the first point of view $24_1$, when the time skip is defined by user selection, and the displayed scene $22_2$ from the second point of view $24_2$.

In some but not necessarily all examples, the scene $22_1$ from the first point of view $24_1$ (FIGS. 11B, 12B) and the scene $22_2$ from the second point of view $24_2$ (FIGS. 11O, 12C) may have in common at least one object and the scene $22_2$ from the second point of view $24_2$ (FIGS. 11O, 12C) is determined by tracking the at least one object 21 that is present in the scene $22_1$ from the first point of view $24_1$ (FIGS. 11A, 12A). The tracked object 21 may, or may not be a modified object 21 in the foreground 104.

The object 21 that is tracked may be selected by a user or, alternatively, it may be selected by the apparatus 30 using computer vision techniques. In some examples, the apparatus 30 using computer vision techniques may highlight objects 21 suitable for selection.

In some but not necessarily all examples, the scene $22_2$ from the second point of view $24_2$ (FIGS. 11O, 12C) is pre-determined by the time t2. For example, each point in time may be associated with a particular point of view 24 and corresponding scene 22. This may be the case where the mediated reality is 'directed', for example, as in a movie.

Computer vision techniques may be used to differentiate foreground objects 21 from background 102. For example feature analysis and/or object segmentation may be used to identify objects, and to determine whether they are foreground or background objects. In some cases, depth data may be provided from a stereoscopic camera or an alternative depth sensing device, and analysis of the depth information be used for differentiating foreground objects from the background objects.

The features defining the object 21 move relative to a background of features if there is movement between an imaging camera 47 and the object 21. This may be achieved by changing a position or orientation of the camera 47, for example or by using a stereoscopic camera or a 360 degree camera.

The modification of the foreground 104 or one or more objects 21 in the foreground 104 may comprise fade-out of the image of the foreground or one or more objects 21 so that it is less clear and more indistinct. For example, the image may be made semi-transparent.

FIGS. 13A-13D are similar to FIGS. 11A-11D and illustrate the virtual space 20 and changing points of view 24 between time t1 and t2. FIG. 13A is similar to FIG. 11B and FIG. 13D is similar to FIG. 11C.

FIGS. 14A-14D are similar to FIGS. 12A-12D and illustrate the virtual scene 22 for changing points of view 24 between time t1 and t2. FIG. 14A is similar to FIG. 12B and FIG. 14D is similar to FIG. 12C.

Before displaying the background $102_2$ of the scene $22_2$ from the second point of view $24_2$ and the modified foreground 104', the method 202 causes display, in series, of backgrounds $102_A$, $102_B$ of intermediate scenes $22_A$, $22_B$ from intermediate points of view $24_A$, $24_B$ between the first point of view $24_1$ and the second point of view $24_2$ and display of modified foreground 104'. The intermediate points of view $24_A$, $24_B$ have different directions $25_A$, $25_B$.

In some but not necessarily all examples, the intermediate scenes $22_A$, $22_B$ defined by the intermediate points of view $24_A$, $24_B$ are selected to have in common a particular foreground object 21.

In some but not necessarily all examples, the modified foreground 104' is fixed. The modified foreground 104' displayed while displaying the backgrounds $102_A$, $102_B$ of intermediate scenes $22_A$, $22_B$ from intermediate points of view $24_A$, $24_B$ may be the modified foreground $104_1$' of the scene from the first point of view $24_1$.

In some but not necessarily all examples, the modified foreground 104' varies. In some of these examples, for each one of multiple intermediate points of view $24_A$, $24_B$ between the first point of view $24_1$ and the second point of view $24_2$, the method 202 causes display of a background $102_A$, $102_B$ of an intermediate scene $22_A$, $22_B$ from the respective intermediate point of view $24_A$, $24_B$ and a modified foreground 104A', 104B' of the intermediate scene $22_A$, $22_B$ from the intermediate point of view $24_A$, $24_B$.

In some but not necessarily all examples, the modified foreground 104' may comprise or consist of a modified foreground object 21' that is common to each one of multiple intermediate scenes $22_A$, $22_B$ defined by intermediate points of view $24_A$, $24_B$ between the first point of view $24_1$ and the second point of view $24_2$. The method 202 causes display of a background $102_A$, $102_B$ of an intermediate scene $22_A$, $22_B$ from the respective intermediate point of view $24_A$, $24_B$ and at least a modification of the common foreground object 21 from the intermediate scene $22_A$, $22_B$ displayed from the intermediate point of view $24_A$, $24_B$.

Figure 15:
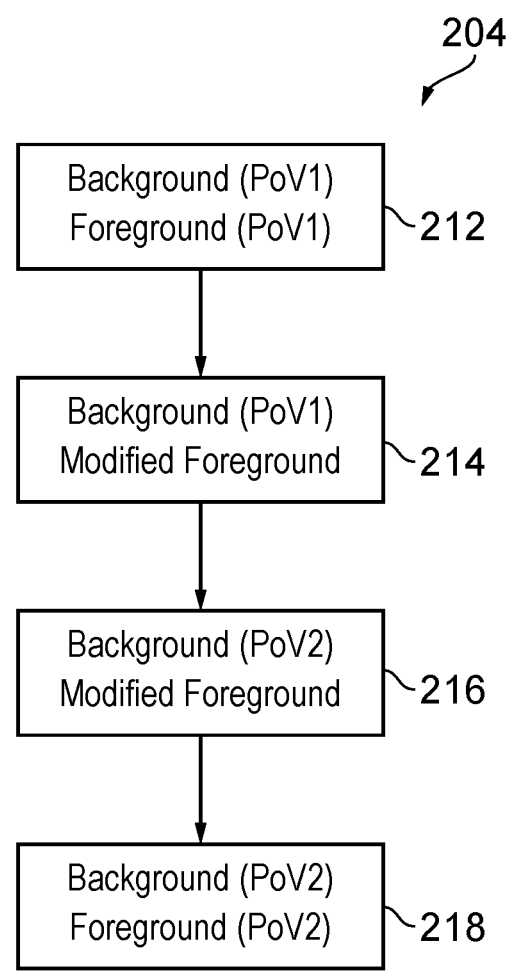
FIG. 15 illustrates an example of a method.

FIG. 15, illustrates a method 204 comprising:
at block, 212, causing display of a background of a scene from a first point of view and a foreground of the scene from the first point of view;
at block, 214, causing display of a background of the scene from the first point of view and a modified foreground of the scene from the first point of view;
at block, 216, causing display of a background of a scene from a second point of view and a modified foreground; and
at block, 218, causing display of a background of a scene from the second point of view and a foreground of the scene from the second point of view.

The apparatus 30, as previously described may comprise means for performing the methods described with reference to FIGS. 9-15.

The computer program 48, may when loaded into a processor perform the methods described with reference to FIGS. 9-15.

The apparatus 30 therefore comprises: at least one processor 40; and at least one memory 46 including computer program code 48 the at least one memory 46 and the computer program code 48 configured to, with the at least one processor 40, cause the apparatus 30 at least to perform:
causing display of a background of a scene from a first point of view and a foreground of the scene from the first point of view;
causing display of a background of the scene from the first point of view and a modified foreground of the scene from the first point of view; causing display of a background of a scene from a second point of view and a modified foreground; and
causing display of a background of a scene from the second point of view and a foreground of the scene from the second point of view.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 may, for example be a module. Tithe apparatus 20 may be a module. The input circuitry may be a module or comprise modules. The display 32 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus comprising at least one processor and at least one non-transitory memory, the at least one non-transitory memory comprising machine-readable instructions, that when executed cause the apparatus to:
provide at least one part of a virtual scene, where the providing of the at least one part of the virtual scene comprises causing the apparatus to:
display a background of a first scene, defined with a first point of view, and a first foreground of the first scene defined with the first point of view;
determine the first foreground of the first scene;

modify the first foreground of the first scene to create a first modified foreground;

display the background of the first scene defined with the first point of view and the first modified foreground;

display a background of a second scene defined with a second point of view different to the first point of view, and a second modified foreground; and display the background of the second scene defined with the second point of view and a second foreground of the second scene defined with the second point of view, where the second foreground of the second scene defined with the second point of view is different from the second modified foreground.

2. An apparatus as claimed in claim 1, wherein a content of the second scene defined with the second point of view depends upon a selected time or time skip.

3. The apparatus of claim 1, further caused to:

before displaying the background of the second scene defined with the second point of view and the second modified foreground, display one or more respective backgrounds of one or more intermediate scenes from one or more respective intermediate points of view between the first point of view and the second point of view and displaying a respective modified foreground.

4. An apparatus as claimed in claim 3, wherein the one or more intermediate scenes from one or more respective intermediate points of view is/are selected to have in common one or more foreground objects with the first modified foreground of the first scene from the first point of view.

5. An apparatus as claimed in claim 1, wherein the second modified foreground displayed while displaying the background of the second scene defined with the second point of view is the first modified foreground of the first scene defined with the first point of view.

6. An apparatus as claimed in claim 1, wherein, for each one of multiple intermediate points of view between the first point of view and the second point of view, the at least one processor and the at least one non-transitory memory comprising machine-readable instructions are configured to cause the apparatus to display a background of an intermediate scene from the intermediate point of view and a modified foreground of the intermediate scene from the intermediate point of view.

7. An apparatus as claimed in claim 1, wherein, for each one of multiple intermediate scenes, each comprising a common foreground object, defined with a respective one of multiple intermediate points of view between the first point of view and the second point of view, the at least one processor and the at least one non-transitory memory comprising machine-readable instructions are configured to cause the apparatus to:

display a background of the intermediate scene from the respective intermediate point of view and at least a modified version of the common foreground object from the intermediate scene from the respective intermediate point of view.

8. An apparatus as claimed in claim 1, wherein the second point of view is determined with tracking of at least one tracked object.

9. An apparatus as claimed in claim 1, wherein the second point of view is pre-defined with a time skip.

10. An apparatus as claimed in claim 1, wherein modifying the first foreground comprises fade-out of image content and/or wherein modifying the first foreground comprises making an object of the first foreground, when displayed, semitransparent.

11. An apparatus as claimed in claim 1, wherein the modified first or second foreground is a modified version of a respective foreground from a same respective point of view as a respective displayed background.

12. An apparatus as claimed in claim 1, wherein the first point of view and the second point of view are points of view within a virtual space that each determine a virtual respective scene and are determined with a user's real point of view.

13. An apparatus as claimed in claim 1, further comprising a controller and a head-mounted display for providing first person perspective-mediated reality, wherein a changing orientation of the head-mounted display determines the first point of view and the second point of view.

14. A method comprising:

providing at least one part of a virtual scene, where the providing of the at least one part of the virtual scene comprises:

displaying a background of a first scene defined with a first point of view and a first foreground of the first scene defined with the first point of view;

determining the first foreground of the first scene;

modifying the first foreground of the first scene to create a first modified foreground;

displaying the background of the first scene, defined with the first point of view, and the first modified foreground;

displaying a background of a second scene defined with a second point of view different to the first point of view, and a second modified foreground; and displaying the background of the second scene defined with the second point of view and a second foreground of the second scene defined with the second point of view, where the second foreground of the second scene defined with the second point of view is different from the second modified foreground.

15. A method as claimed in claim 14, wherein a content of the second scene defined with the second point of view depends upon a selected time or time skip.

16. A method as claimed in claim 14, comprising:

before displaying the background of the second scene defined with the second point of view and the second modified foreground, displaying one or more respective backgrounds of one or more intermediate scenes from one or more respective intermediate points of view between the first point of view and the second point of view and displaying a respective modified foreground.

17. A method as claimed in claim 16, wherein the one or more intermediate scenes from one or more respective intermediate points of view is/are selected to have in common one or more foreground objects with the first modified foreground of the first scene from the first point of view.

18. A method as claimed in claim 14, wherein the second modified foreground displayed while displaying the background of the second scene defined with the second point of view is the first modified foreground of the first scene defined with the first point of view.

19. A method as claimed in claim 14, wherein, for each one of multiple intermediate points of view between the first point of view and the second point of view, displaying a background of an intermediate scene from the intermediate point of view and a modified foreground of the intermediate scene from the intermediate point of view.

20. At least one non-transitory computer readable medium comprising instructions that, when executed with at least one processor, causes the at least one processor to perform:
- provide at least one part of a virtual scene, where the providing of the at least one part of the virtual scene comprises causing the at least one processor to perform:
  - display a background of a first scene, defined with a first point of view, and a first foreground of the first scene defined with the first point of view;
  - determine the first foreground of the first scene;
  - modify the first foreground of the first scene to create a first modified foreground;
  - display the background of the first scene defined with the first point of view and the first modified foreground;
  - display a background of a second scene defined with a second point of view different to the first point of view, and a second modified foreground; and
  - display the background of the second scene defined with the second point of view and a second foreground of the second scene defined with the second point of view, where the second foreground of the second scene defined with the second point of view is different from the second modified foreground.

* * * * *